M. F. BOOTH

Sept. 8, 1931. COOLING UNIT FOR REFRIGERATING SYSTEMS Re. 18,182

Original Filed Feb. 13, 1930 2 Sheets-Sheet 1

INVENTOR
Morris F. Booth
BY
Stuart C. Barnes
ATTORNEY

M. F. BOOTH

Sept. 8, 1931. COOLING UNIT FOR REFRIGERATING SYSTEMS Re. 18,182

Original Filed Feb. 13, 1930 2 Sheets-Sheet 2

INVENTOR
Morris F. Booth
Stuart C. Barnes
ATTORNEY

Reissued Sept. 8, 1931 Re. 18,182

UNITED STATES PATENT OFFICE

MORRIS F. BOOTH, OF SALEM, OHIO, ASSIGNOR TO MULLINS MANUFACTURING CORPORATION, OF SALEM, OHIO, A CORPORATION OF NEW YORK

COOLING UNIT FOR REFRIGERATING SYSTEMS

Original No. 1,798,652, dated March 31, 1931, Serial No. 428,021, filed February 13, 1930. Application for reissue filed July 20, 1931. Serial No. 551,816.

This invention relates to cooling units for refrigerating systems, and has to do particularly with a cooling unit of the sheet metal type and provided with a suitable header.

The present invention is a continuation in part of my application No. 378,843, filed July 17, 1929, and is mainly directed to novel improvements in the fabrication of the complete sheet metal unit and in the details of the novel completed unit.

More specifically, it is the object of the present invention to provide a cooling unit preferably formed of a single sheet of metal, the header and side walls of which are completely fabricated and formed prior to shaping the unit. In this case, the header and float chamber and the side walls are preferably stamped from sheet metal, one or more of the side walls being corrugated and the contacting portions between the corrugations being welded together prior to distortion.

Another important feature of this invention resides in the manner of fabricating the unit whereby the side walls which are formed integral with the header, and which lead therefrom, are positioned above the point at which the ends of the side walls contact with the header. This not only results in marked efficiencies in the operation of the unit but also results in a marked saving in assembly and fabrication. The side walls which lead from the upper part of the header are preferably provided with a plurality of inlets but the ends of these side walls and particularly the corrugations thereof preferably terminate in a manifold which in turn may terminate in a single outlet connected with the interior of the header. This results in much stronger header construction, and particularly results in effecting a positive circulation of the refrigerant.

Other features reside in the details of construction as will be more clearly brought out in the specification and claims.

The present unit may be fabricated from sheet metal into many different types and shapes of cooling units and for this reason the drawings must be considered as more or less diagrammatic. Regardless of the form of the cooling unit I preferably fabricate the same from relatively thin gauge sheet metal. In order to permit of quick and inexpensive assembly, this sheet metal is preferably shaped to provide a flat side 1, a corrugated side 2 and a header portion or drum 3. It will be understood that both the sides 1 and 2 may be corrugated if desired, but in the simplest form only one side need be corrugated.

Figure 1:
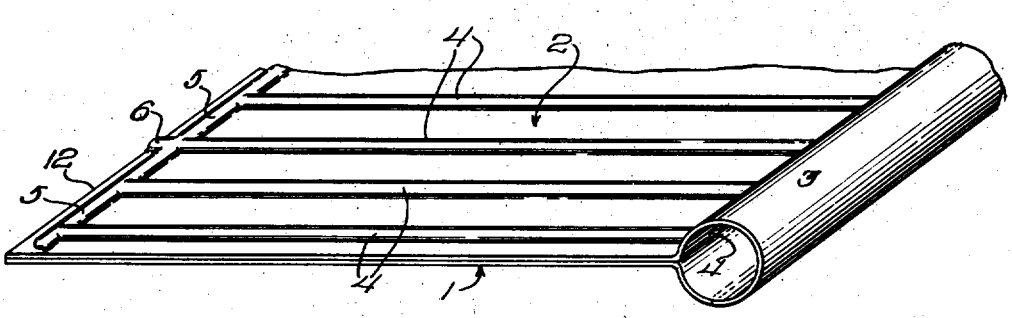
Fig. 1 is a perspective view illustrating the form of the unit after it has been fabricated and preparatory to being shaped.

The sheet metal blank is preferably initially formed by stamping out the header or drum 3, the corrugated portion of the side wall 2 and then folding over the same as shown in Fig. 1. The corrugations 4 in this side wall preferably terminate in a manifold 5 and this manifold 5 in turn terminates in a suitable connecting conduit 6. There may be one or more of these conduits 6 but one is all that is necessary, as will be later explained.

When the two side walls are folded together, as shown in Fig. 1, they preferably are inserted in a suitable stitching machine or other form of welding machine and the contacting faces of the two side walls, between the corrugations, suitably secured together. The side walls may then be gradually bent so as to form the complete cooling unit and in Fig. 2 I have shown one form of so bending the side walls.

Figure 2:
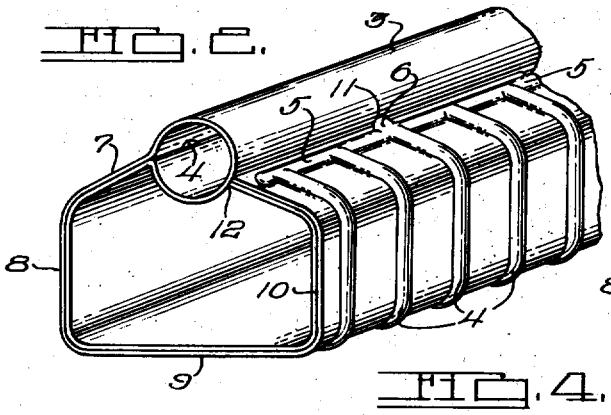
Fig. 2 is a perspective view illustrating one manner of forming the unit shown in Fig. 1.

In forming the unit, the side wall immediately adjacent the header 3 is preferably bent at an angle as at 7, then bent to form the side wall 8, the bottom wall 9 and the spaced side wall 10. In Fig. 2 the walls 8, 9 and 10 form three sides of the unit, and the bottom part of the header and the inclined walls extending from the header form the fourth side. The walls of the header 3 are preferably imperforate except at a point 11 where the conduit 6 is connected to the interior of the header. The end 12 of the two walls 1 and 2 may, if desired, be welded to the outer surface of the header 3 but due to the provision of the manifold 5 the ends of said walls are not connected with the interior of the header.

The point 11 at which the conduit 6 enters the header 3 is preferably at a lower level than the level at which the corrugations 4 lead into the header 3, but both the level of the outlet conduit 6 and that of the inlet conduits formed by the corrugations 4 are preferably below the normal level of the liquid within the header.

Figure 3:
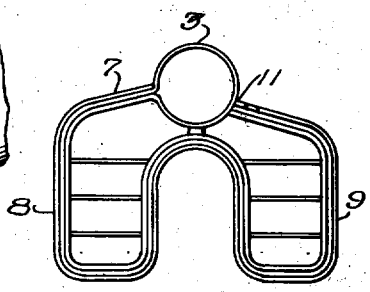
Fig. 3 illustrates a modified construction wherein the fabricated side walls are shaped to provide a plurality of sharp freezing chambers.

In Fig. 3 I have illustrated a slightly modified form of construction wherein the bottom wall is bent to form three separate sharp freezing chambers. In this connection, it will be obvious that after the side walls are formed, as shown in Fig. 1, they may be shaped in substantially any manner desired so as to form sharp freezing chambers completely surrounded by refrigerant or only partially surrounded by refrigerant.

Figure 4:
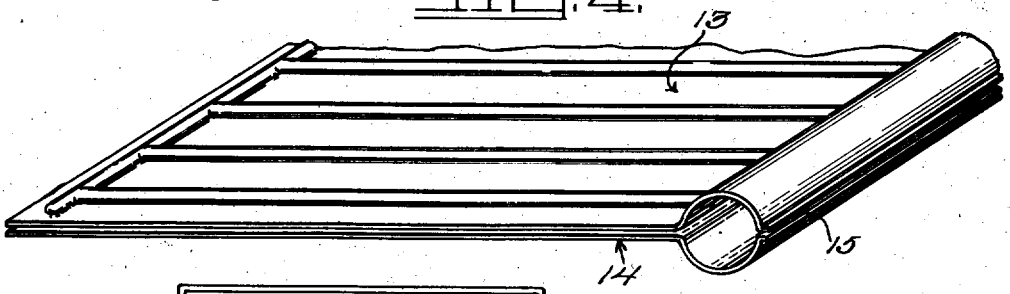
Fig. 4 is a perspective view illustrating a modified step in the method of manufacture wherein the complete unit is formed from two preformed halves.

In fabricating the original sheets of metal before distorting the sides to form the cooling unit, I may form the sheets in two integral halves, as best shown in Fig. 4. In this case the one half may be generally designated 13 and the other half 14, and it will be obvious that such two halves may be stamped out and fabricated to form the same relative unit as that shown in Fig. 1. The only exception would be the fact that the header is formed in two parts with the result that the halves 15 will have to be welded or otherwise secured together. It will be obvious that the point at which the header is divided may be substantially any point in its circumference so that this method of fabrication greatly assists in forming the inlet 11 to the header.

The main feature of the form of construction shown in Fig. 4 is the fact that the entire unit is formed from only two halves each of which may be integrally stamped out and secured together without any bending, the bending operation only taking place after the two walls are secured together.

Figure 5:
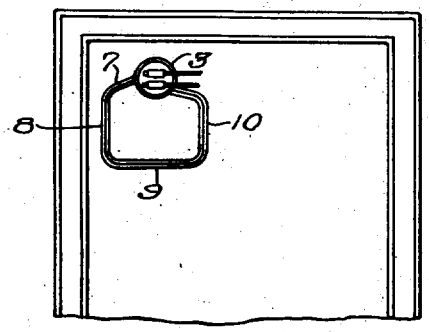
Fig. 5 illustrates the preferred manner of positioning my novel unit within a cabinet.

In Fig. 5 I have illustrated the preferred manner of mounting my novel unit within a suitable refrigerating cabinet. By positioning the unit in the manner shown, it will be obvious that the circulation of air past the side 8 will materially assist in the vaporization of the liquid in such side wall with the result that the vaporized refrigerant will rise and enter the header 3 and will in turn be replaced by liquid refrigerant which will flow outwardly through the conduit 6 and around the passageways of the cooling unit. Inasmuch as the outlet of gaseous refrigerant from the header is limited by the size of the exhaust passageway or the exhaust valve, it will be obvious that the outlet conduit 6 need only be approximately the same size as the gaseous outlet to the compressor. It will thus be seen that it is only necessary to form a single small opening 11 in the header 3 which will reduce the possibility of leakage to a minimum.

Figure 6:
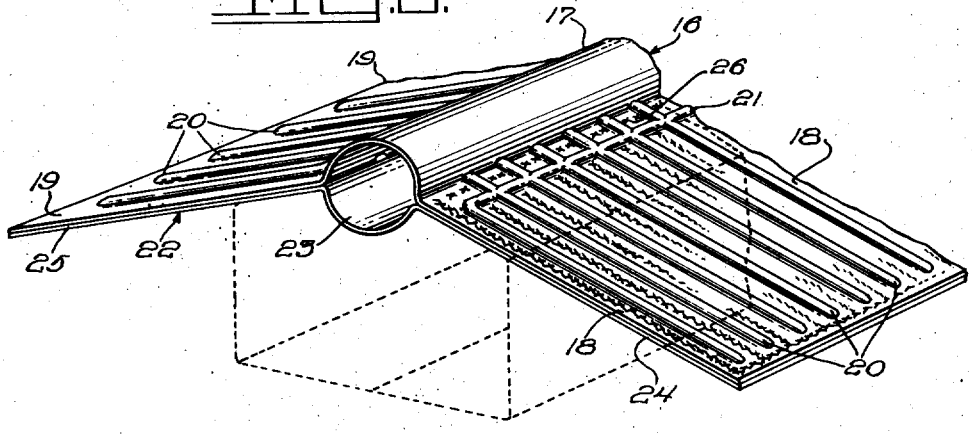
Fig. 6 is a perspective view illustrating a modified form of the invention wherein the unit including the header thereof is fabricated from two preformed sheets of metal, the two wings and the entire unit being welded together before being bent into shape.

In Fig. 6 I have disclosed the manner of forming a cooling unit somewhat along the lines of the unit disclosed in Fig. 4, in that the entire unit is initially formed of two sheet metal stampings. The upper stamping may be generally designated 16 and may consist of the semi-spherical header portion 17 and the two wings 18 and 19. Each wing is preferably provided with a series of corrugations 20, these corrugations terminating in a manifold 21.

The lower half may be generally designated 22 and preferably consists of a semi-spherical header member 23 together with the flat wings 24 and 25. In assembling this unit, the two halves 16 and 22 are positioned together as shown in Fig. 6, and each wing inserted in a suitable stitch welding machine. All that is necessary is to stick each wing in such machine and feed the wing in as the stitches are made longitudinally in between each corrugation 20. The pockets 26, formed at points adjacent the headers by the corrugations 20 and the manifolds 21, may also be utilized in effecting a final welding or joining of the two sheet metal halves directly adjacent the header member. As the parts are secured together in the manner illustrated, the two wing members may be bent as shown in dotted lines so as to form the sharp freezing chamber. If desired, it will be obvious that the wing members may be somewhat lengthened so that they may be bent in the general form shown in Fig. 3.

Figure 7:
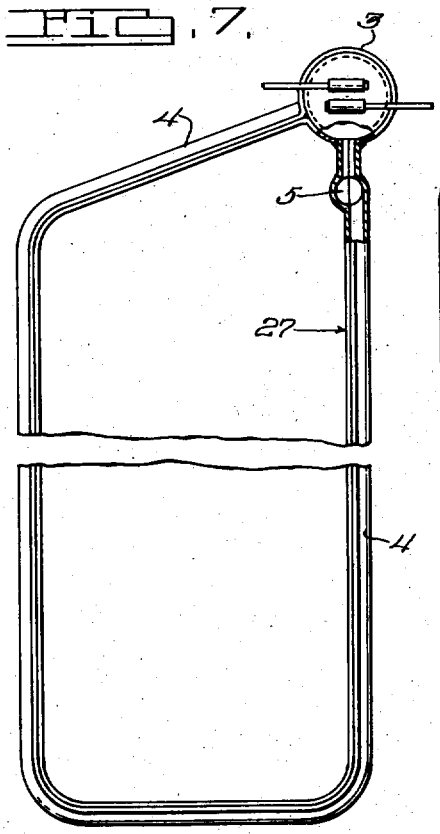
Fig. 7 is a front elevation of a further modified form of the invention wherein the return side of the passageways formed by the sheet metal sections terminates at the bottom of the header.

A further modified form of construction is illustrated in Fig. 7 wherein the header is formed in one piece as shown in Fig. 1, but the sheet metal wall forming the passageways is so formed as to terminate in a vertical wall 27 which preferably enters the header at a point adjacent the bottom thereof.

Figure 8:
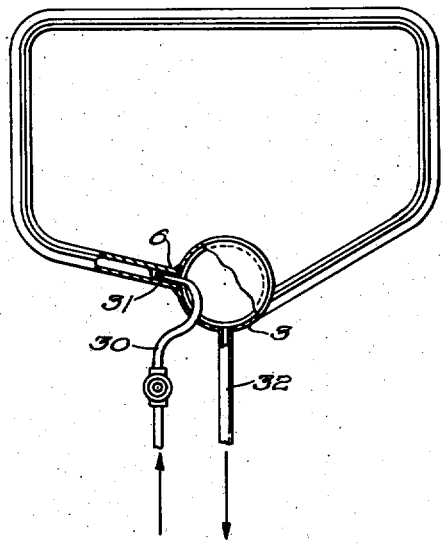
Fig. 8 is a somewhat diagrammatic view illustrating a unit embodying the features of the present invention but adapted to be utilized in connection with a refrigerating system of the "dry" type.

In Fig. 8 I have shown a unit of substantially identical construction to the unit shown in Fig. 2 but inverted so as to be readily adapted to a refrigerating system of the "dry" type. In this modification, the conduit 6 enters the header 3 in the same manner as shown in Fig. 3, and the intake conduit 30 for the incoming refrigerant preferably terminates in a reduced nozzle 31 within the conduit 6. This reduced nozzle is slightly smaller than the inlet end of the conduit 6 with the result that any oil that should become trapped in the one side of the unit will drop back to the bottom of the header 3 between cycles of operation where it will again be picked up by the suction line at the beginning of the next cycle. The suction line may be designated as at 32 and preferably is positioned at the bottom of the header 3.

In each of Figs. 1 to 7, it will be understood that the ends of the boiler or evaporator may be closed in by suitable caps, the front end being closed by a suitable header cap as generally indicated in Figs. 5 and 7 whereby to receive the intake and exhaust valve structure.

It will be obvious that in each case I have provided a pressed or stamped sheet metal evaporator, the header or boiler chamber of which is formed of one contiguous wall or, in the example shown in Figs. 4 and 5, is formed of two walls each of which is pressed out from sheet metal blanks and welded at points longitudinally of the boiler. The boiler in each case is, therefore, so constructed as to have the greatest tendency to resist all strains placed thereupon by pressure within the boiler. Furthermore, the passageways formed by the sheet metal walls are additionally arranged so as to produce a positive thermo-siphon effect.

What I claim is:

1. A cooling unit formed of sheet metal, comprising a substantially cylindrical header terminating in two spaced walls, said walls being bent to form side and bottom walls of a sharp freezing chamber, passageways in said walls and starting at said header for conducting refrigerant, a manifold at the end of said walls for connecting the ends of the passageways and means connecting the manifold with the interior of the header.

2. A cooling unit formed of sheet metal, comprising a substantially cylindrical header terminating in two spaced walls, said walls being bent to form walls of a sharp freezing chamber, passageways in said walls and starting at said header for conducting refrigerant, a manifold at the end of said walls for connecting the ends of the passageways and means connecting the manifold with the interior of the header, the point at which the manifold is connected with the header being below the level of the point where the two walls of the header terminate in the side walls.

3. A cooling unit of the type having a sheet metal header and a sharp freezing chamber formed of walls fabricated to provide refrigerant passageways, the end of one wall being formed by a continuation of the header walls whereby the passageways thereof connect directly with the interior of the header and the other end of the wall terminating in a manifold connected to an opening in the header.

4. A cooling unit of the type having a sheet metal header and a sharp freezing chamber formed of walls fabricated to provide refrigerant passageways, the end of one wall being formed by a continuation of the header walls whereby the passageways thereof connect directly with the interior of the header and the other end of the wall terminating in a manifold connected to an opening in the header, said two walls adjacent the header sloping outwardly and downwardly and said manifold and passageways connecting with the header at different levels.

5. A sheet metal evaporator comprising an outer one-piece shell having an arcuate portion and laterally extending side walls bent to form a sharp freezing chamber or chambers, an inner one piece shell having an oppositely formed arcuate portion and laterally extending walls cooperating with the side walls of the outer shell, said two arcuate portions registering complementally to form a substantially cylindrical header, one of said laterally extending walls being embossed to provide passageways leading from said header, and a manifold formed in one of said walls and extending transversely of the passageways at a point adjacent the header.

6. A sheet metal evaporator comprising outer and inner shells fabricated to each form a portion of a cylindrical header and laterally and downwardly depending side walls, one of said side walls being corrugated and said corrugations being open at one end to permit welding the shells together in the spaces between their corrugations before bending, said welded side walls being bent to form the sides and bottom of a sharp freezing chamber.

7. A sheet metal evaporator comprising outer and inner shells fabricated to each form a portion of a cylindrical header and depending side walls, one of said side walls being corrugated and said corrugations being open at one end and terminating at the other end in a manifold positioned closely adjacent the cylindrical header to permit welding the shells together in the spaces between their corrugations before bending, said welded side walls being bent to form the sides and bottom of a sharp freezing chamber.

8. An evaporator, comprising outer and inner shells each having arcuate portions cooperating to form a cylindrical header and each having matching side walls to form side walls of a sharp freezing chamber, the walls of one of said shells having corrugations extending at right angles to the axis of the header to form laterally extending passageways from the header, and a corrugated manifold extending transversely across said first named corrugations and spaced a short distance from said header, the two walls being secured together in the spaces between the corrugations.

9. A process of making an evaporator for a refrigerator from two sheets of metal, which consists in forming complementary header depressions in a portion of each sheet and laterally extending parallel corrugations in one sheet, said corrugations opening at one end into said header portion and terminating near the opposite edge of said sheet, superimposing said sheets so that the header portions register, welding the sheets together on lines between the corrugations, and then bending the sheets thus secured together into the form of an evaporator, the sheets being sealed by welding together the edges thereof.

10. A process of making an evaporator for a refrigerator from two sheets of metal, which consists in forming complementary header depressions in the central portion of each sheet and laterally extending parallel corrugations in one sheet, said corrugations opening at one end into said header portion and terminating near the opposite edge of said sheet, superimposing said sheets so that the header portions register, welding the sheets together on lines between the corrugations and around the edges and then bending the sheets thus secured together into the form of an evaporator.

11. The process of making a sheet metal evaporator, which consists in forming a substantially circular header portion with laterally extending side walls and laterally extending corrugations in one wall, said corrugations opening at one end into the header portion and terminating near the opposite end of the side wall, superimposing the side walls together so that arcuate portions of the header register, welding the side walls together on lines between the corrugations while said side walls extend laterally from the header in substantially the same plane, and then bending the walls thus secured together into the form of an evaporator, the side walls being sealed by welding together the edges thereof.

12. The process of making a sheet metal evaporator, which consists in forming a substantially circular header portion with laterally extending side walls and laterally extending corrugations in one wall, said corrugations opening at one end into the header portion and terminating near the opposite end of the side wall, superimposing the side walls together so that arcuate portions of the header register, welding the said walls together on lines between the corrugations while said side walls extend laterally from the header in substantially the same plane, and then bending the walls thus secured together, starting at a point spaced from the header wall, into the form of an evaporator, the side walls being sealed by welding together the edges thereof.

13. A sheet metal cooling unit of the flooded type comprising a liquid and gas chamber, conduits formed by an extension of material forming the chamber and extending from a point along one side thereof and downwardly to define a sharp freezing chamber, an opening in the wall of said chamber, spaced from a point where said conduits lead from the wall thereof, a manifold connecting the ends of said conduits, and a conduit connecting said manifold with said opening in the said chamber.

14. A sheet metal evaporator comprising outer and inner shells fabricated to each form a portion of a cylindrical header, adjacent arcuate walls of said header contacting and extending laterally and substantially radially from said cylindrical header, laterally extending corrugations in said laterally extending walls to form passageways extending into the header, said contacting laterally extending walls being welded together around the edges and in the spaces between the corrugations up to a point adjacent the header, said laterally extending walls being bent downwardly after welding between the corrugations and at a point spaced from the header to form a sharp freezing chamber, and a corrugated manifold extending substantially parallel with said header and connecting the ends of said first named lateral corrugations.

15. A cooling unit consisting of a symmetrical piece of metal folded upon itself on substantially center transverse line, the two wing of the sheet being spaced at the line of fold to form a header and the remainder of the wings being secured together about their edges, internal passageways formed in at least one wing and extending from said header to near the opposite side of said unit, said wing portion of the unit forming at least two sides of a sharp freezing chamber and means for closing the open ends of said header.

16. A cooling unit of the flooded type, comprising a float chamber the sides of which are formed of contiguous sheet metal walls, one of which is corrugated, said walls meeting and contacting except for said corrugations and extending laterally from one side only of the chamber and then downwardly to form refrigerant passageways and at least two walls of a refrigerating chamber.

17. A cooling unit of the flooded type, comprising a header chamber substantially cylindrical in shape, the drum of said chamber formed from a single piece of sheet metal, said piece of sheet metal meeting and continuing as adjacent walls to form the sharp freezing chamber of the unit, said adjacent walls being permanently secured together and formed to provide passageways for the refrigerant, and said walls extending downwardly and outwardly from the float chamber so as to provide inclined passageways for the refrigerant, and then downwardly to form an outer wall of the sharp freezing chamber.

18. A sheet metal evaporator comprising an outer shell having an arcuate portion and laterally extending walls bent to form the outer wall of a portion of the top, side and bottom of a sharp freezing chamber or chambers, an inner one piece shell having an oppositely formed arcuate portion and laterally extending walls bent to cooperate with the top, side and bottom walls of the outer shell, the edges of said two arcuate portions meeting and registering complementally to form a substantially cylindrical header, the top wall of the sharp freezing chamber formed by the laterally extending walls of the outer and inner shell being substantially flat and positioned substantially radially to the axis of the header whereby the plane of the top wall where it merges into the arcuate walls of the header is substantially normal to the surface of the header, and embossed portions in one of said laterally extending walls whereby to permit welding in between the ends of the laterally extending walls and up to points closely adjacent the substantially cylindrical header.

19. A sheet metal evaporator comprising an outer shell of relatively thin gauge sheet metal, said shell having an arcuate portion and said arcuate portion terminating in a laterally extending wall, said wall extending substantially radially from the axis of said arcuate portion and being bent at a point spaced from the arcuate portion into a substantially vertical downwardly extending side wall of a sharp freezing chamber, an inner one piece shell of relatively thin gauge sheet metal having an oppositely formed arcuate portion and laterally extending walls cooperating with the radial and vertical walls of the outer shell, said two arcuate portions meeting and registering complementally to form a substantially cylindrical header, the radially extending portion of said walls being inclined downwardly and outwardly, and the point at which said walls merge into the substantially vertical wall being substantially level with the bottom of the header, one of said walls being embossed to permit welding together of the walls at points in between the ends thereof and closely adjacent the walls of the header.

20. A sheet metal evaporator comprising an outer shell of relatively thin gauge sheet metal and having an arcuate portion, one of the ends of said arcuate portion terminating in a laterally extending wall, said wall extending substantially radially from the axis of said arcuate portion and in a flat plane to a point spaced from the edge of the arcuate portion where said wall is bent into a substantially vertical side wall of a sharp freezing chamber, an inner one piece shell of relatively thin gauge sheet metal having an oppositely formed arcuate portion of substantially the same size and shape as the arcuate portion of the outer shell, said oppositely formed arcuate portion cooperating with the first named arcuate portion to form a substantially cylindrical header, and having walls cooperating with the walls extending from the arcuate portion of the outer shell, said radially positioned top walls extending slightly downwardly and the point at which said radial and downwardly extending walls terminate in the vertical side wall of the sharp freezing chamber being substantially on a level with the bottom of the header, one of said radially extending walls being embossed to permit welding together of the complemental walls in between the ends thereof and at points closely adjacent said header.

21. The process of making an evaporator from two sheets of metal, which consists in first stamping the sheets of metal to form embossed portions at predetermined points in each sheet, an embossed portion in one sheet consisting of a substantially half cylindrical depression adapted to cooperate with the other sheet to form a header portion, forming laterally extending parallel embossed portions in one sheet, said embossed portions opening at one end into said header portion and terminating near the opposite edge of said sheet, superimposing said sheets so that the header portions and flat walls extending therefrom register, welding the sheets together around the edges and on lines between the embossed portion and up to points closely adjacent the header portions, and then bending the sheets thus secured together to form two side walls and a bottom wall of a sharp freezing chamber.

22. A sheet metal evaporator comprising outer and inner shells fabricated to each form a portion of a cylindrical header, adjacent arcuate walls of said header contacting and extending laterally and substantially radially from said cylindrical header, laterally extending corrugations in said laterally extending walls to form passageways extending into the header, at least one of said corrugations terminating short of the header, said contacting laterally extending walls being welded together around the edges and in the spaces between the corrugations up to a point adjacent the header, said laterally extending walls being bent after welding between the corrugations to form a sharp freezing chamber, and a corrugated manifold extending substantially parallel with said header and connecting the end of the corrugation terminating short of the header with one of the corrugations extending into the header.

23. A sheet metal evaporator comprising an outer shell having an arcuate portion and laterally extending walls bent to form the outer wall of a portion of the top, side and bottom of a sharp freezing chamber or chambers, an inner one piece shell having an oppositely formed arcuate portion and laterally extending walls bent to cooperate with the top, side and bottom walls of the outer shell, the edges of said two arcuate portions meeting and registering complementally to form a substantially cylindrical header, the top wall of the sharp freezing chamber formed by the laterally extending walls of the outer and inner shell being substantially flat and positioned substantially radially to the axis of the header whereby the plane of the top wall where it merges into the arcuate walls of the header is substantially normal to the surface of the header, and embossed portions in one of said laterally extending walls whereby to permit welding in between the ends of the laterally extending walls and up to points closely adjacent the substantially cylindrical header, one of said embossed portions forming a passageway extending into the header and an adjacent embossed portion terminating short of the header and a transversely embossed portion forming a manifold for connecting the embossed portion terminating short of the header with the embossed portion extending into the header.

In testimony whereof I affix my signature.

MORRIS F. BOOTH.